Dec. 6, 1932.  L. R. PAPP  1,890,190
PARACHUTE ATTACHMENT FOR AEROPLANES
Filed Dec. 24, 1931  2 Sheets-Sheet 1

Inventor
Louis R. Papp.
By Bryant & Lowry
Attorneys

Dec. 6, 1932.  L. R. PAPP  1,890,190
PARACHUTE ATTACHMENT FOR AEROPLANES
Filed Dec. 24, 1931   2 Sheets-Sheet 2

Inventor
Louis R. Papp.
By Bryant & Lowry
Attorneys

Patented Dec. 6, 1932

1,890,190

UNITED STATES PATENT OFFICE

LOUIS R. PAPP, OF CLEVELAND, OHIO

PARACHUTE ATTACHMENT FOR AEROPLANES

Application filed December 24, 1931. Serial No. 583,100.

This invention relates to certain new and useful improvements in parachute attachment for aeroplanes.

The primary object of the invention is to provide a parachute attachment for aeroplanes wherein the parachute that is normally housed within the fuselage of the aeroplane adjacent the upper side and forward end thereof is manually releasable for projection above the aeroplane to aid in suspension of the aeroplane and gradual descent thereof should the aeroplane motor fail to operate or should descending movement in a perpendicular path be desired.

A further object of the invention is to provide a parachute attachment for aeroplanes of the umbrella character embodying ribs or links and spring devices for maintaining the parachute in extended condition and for the spring projection thereof from a carrying compartment within the fuselage of the aeroplane.

With the above and other objects in view that will become apparent as the nature of the invention is better understood, the same consists in the novel form, combination and arrangement of parts hereinafter more fully desrcibed, show in the accompanying drawings and claimed.

In the drawings:—

Figure 1:
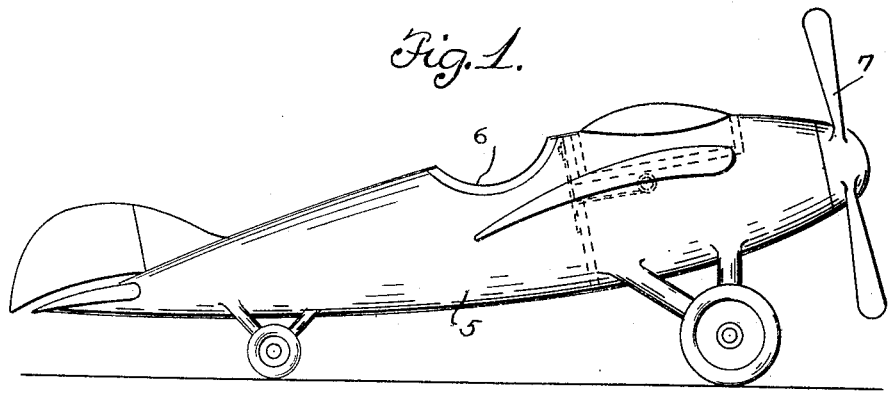
Figure 1 is a side elevational view of an aeroplane equipped with the parachute attachment.
Figure 2:
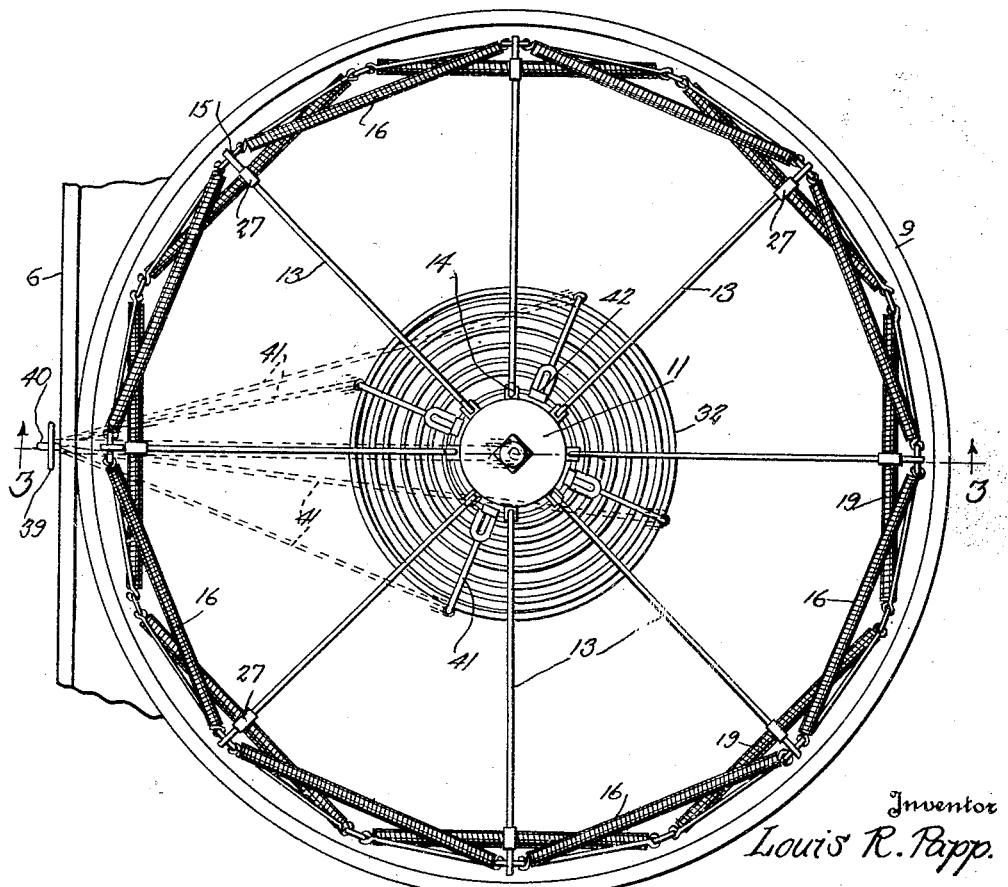
Figure 2 is a top plan view of the parachute with the parachute cover removed to illustrate the links, rod and spring structure of the parachute.

Referring more in detail to the accompanying drawings, the reference numeral 5 designates the fuselage of an aeroplane provided with the usual landing gear, rudder and elevating mechanism, the cockpit 6 for the pilot and the forwardly positioned propeller 7. The upper side of the fuselage 5 forwardly of the cockpit 6 is provided with a compartment for housing a parachute, the compartment having a bottom wall 8 and a perpendicular surrounding side wall 9.

The parachute comprises a centrally disposed ring 10 and a cap plate 11 disposed above the ring and normally spaced therefrom by the interposed coil spring 12. A plurality of ribs 13 are pivotally connected at their inner ends as at 14 to the cap plate 11 and radiate from said cap plate, the outer ends of the ribs 13, each being engaged with a ring 15, the several rings at the outer ends of the ribs 13 being connected by horizontally disposed coil springs 16. Each ring 15 has pivotally connected thereto a pair of downwardly diverging rods 17 with the adjacent lower ends of adjacent pairs of rods 17 pivotally connected to a ring 18, between which rings horizontally disposed coil springs 19 extend. The lower rings 18 each have a rod 20 pivotally connected thereto and depending therefrom with the lower ends of the rods 20 of pairs of rings 18 connected to a ring 21 that is carried by a chain 22 anchored at its lower end as at 23 to the bottom wall 8 of the parachute compartment. The rib, rod and spring structure of the parachute frame is retained in a concentric position relative to the center ring 10 by the radial ribs 24 pivotally connected at their inner ends as at 25 to the ring 10 while their outer ends are pivotally connected as at 26 to clamps 27 carried by the outer ends of the ribs 13. The fabric covering 28 for the parachute frame is anchored as at 29 to the cap plate 11, the cover including a depending apron 30 from which tying anchor straps 31 depend for attachment to the rings 21 at the lower ends of the rods 20.

Figure 3:
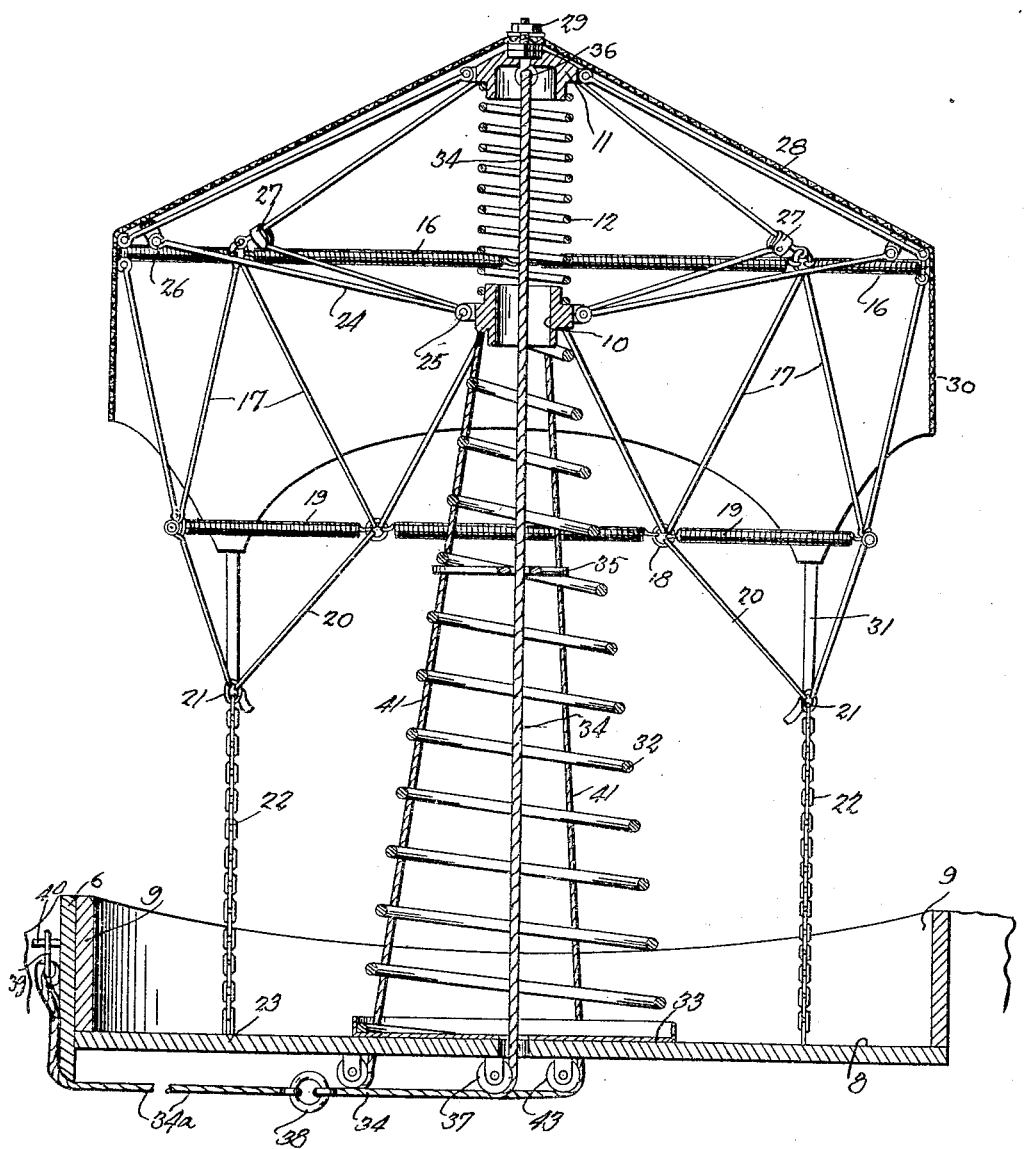
Figure 3 is a vertical longitudinal sectional view taken on line 3—3 of Figure 2, showing the parachute in extended position above the fuselage of the aeroplane.

As shown more clearly in Figure 3, a relatively large helical spring 32 is supported at its lower larger end upon the mounting plate 33 upon the bottom wall 8 of the parachute compartment while its upper smaller end is secured to the ring 10, the springs 32 and 12 operating to project the parachute from the compartment in the fuselage and for descending the parachute body to fully extended position.

The means for confining the parachute in collapsed form within the compartment of the fuselage comprises a main central cord 34 disposed centrally of the helical spring 32 and passing through an opening in a guide bar 35 arranged intermediate the upper and lower ends of the spring 32, the pull cord 34 passing through the ring 10 and anchored at its upper end as at 36 to the cap plate 11. The lower end of the pull cord 34 passes through an opening in the bottom wall 8 of the parachute compartment and is directed over a guide pulley 37 with a ring 38 interposed in the length thereof, the outer end 34a of the pull cord carrying a ring 39 for attachment to a hook 40 utilized as illustrated in Figure 3 when the parachute is in an extended position. Additional pull cords 41 are disposed at the outer sides of the spring 32, passing through openings in the guide frame 35 with their upper ends attached as at 42 to the ring 10 while their lower ends pass through openings in the bottom wall 8 of the parachute compartment to be directed over guide rollers 43 for mergence with the pull cord 34 at the underside of the parachute compartment whereby a pull upon the cord section 34a operates the pull cords 34 and 41.

From the above detailed description of the invention, it is believed that the construction and operation thereof will at once be apparent, it being noted that when the parachute is in the collapsed and confined position in the parachute compartment as illustrated in Figure 1, the ring 38 is engaged with the hook 40 disposed in the cockpit 6 of the fuselage for convenient operation by the pilot, the parachute cover 28 then forming a part of the upper wall of the fuselage overlying the parachute compartment. When it is desired to release and extend the parachute, the ring 38 is disengaged from the hook 40 and the springs 32 and 12 automatically project the parachute from the compartment within the fuselage to the extended position shown in Figure 3 and at which time the ring 39 upon the pull cord section 34a may be engaged with the hook 40. The ribs, rods and spring structure of the parachute frame maintain the same at all times in expanded condition and is to be of a size sufficient to support the weight of the aeroplane during descending movement, the ribs, rods and spring devices of the parachute frame permit flexibility of movements of the different parts all of which are relatively movable so that injury to the parachute during flight will be eliminated. The main spring 32 is of a size to insure instant projection of the parachute from the confining compartment immediately upon release thereof so that no time will be lost in bringing the parachute into operation when occasion requires.

While there is herein shown and described the preferred embodiment of the invention, it is nevertheless to be understood that minor changes may be made therein without departing from the spirit and scope of the invention as claimed.

I claim:—

1. In a parachute attachment for aeroplanes, a parachute of umbrella formation including a center ring and cap plate, a coil spring interposed therebetween, radial ribs pivoted to the ring and cap plate and arranged in pairs with the outer ends of each pair pivotally connected, horizontally disposed coil springs connecting the outer ends of the ribs, angularly disposed rods depending from the outer ends of the ribs, horizontal coil springs connecting the lower ends of the rods and means attaching the lower ends of the rods to the aeroplane.

2. In a parachute attachment for aeroplanes, a parachute of umbrella formation including a center ring and cap plate, a coil spring interposed therebetween, radial ribs pivoted to the ring and cap plate and arranged in pairs with the outer ends of each pair pivotally connected, horizontally disposed coil springs connecting the outer ends of the ribs, angularly disposed rods depending from the outer ends of the ribs, horizontal coil springs connecting the lower ends of the rods, means attaching the lower ends of the rods to the aeroplane, and a coil spring interposed between the ring and aeroplane for automatic projection of the parachute to operative position.

3. In a parachute attachment for aeroplanes, a parachute of umbrella formation including a center ring and cap plate, a coil spring interposed therebetween, radial ribs pivoted to the ring and cap plate and arranged in pairs with the outer ends of each pair pivotally connected, horizontally disposed coil springs connecting the outer ends of the ribs, angularly disposed rods depending from the outer ends of the ribs, horizontal coil springs connecting the lower ends of the rods, means attaching the lower ends of the rods to the aeroplane, a coil spring interposed between the ring and aeroplane for automatic projection of the parachute to operative position, and pull cords for retracting the parachute into inoperative position.

In testimony whereof I affix my signature.

LOUIS R. PAPP.